United States Patent [19]

Oishi et al.

[11] Patent Number: 4,719,529
[45] Date of Patent: Jan. 12, 1988

[54] MAGNETIC TAPE CASSETTE INCORPORATING PREVENTION OF UNWANTED ROTATION DURING TRANSPORTATION

[75] Inventors: Kengo Oishi; Choji Komiyama, both of Kanagawa, Japan

[73] Assignee: Fuji Photo Film Co., Ltd., Kanagawa, Japan

[21] Appl. No.: 783,397

[22] Filed: Sep. 27, 1985

[30] Foreign Application Priority Data

Oct. 12, 1984 [JP] Japan ............................ 59-153111[U]

[51] Int. Cl.⁴ ............................................. G11B 23/08
[52] U.S. Cl. .................................................. 360/132
[58] Field of Search ........................ 360/132; 242/198

[56] References Cited

U.S. PATENT DOCUMENTS

4,572,461 2/1986 Horikawa et al. ................... 360/132
4,646,190 2/1987 Meguro ................................ 360/132

FOREIGN PATENT DOCUMENTS

57-147172 9/1982 Japan .................................. 360/132

Primary Examiner—Robert S. Tupper
Attorney, Agent, or Firm—Sughrue, Mion, Zinn, Macpeak, and Seas

[57] ABSTRACT

A small sized tape cassette is provided with a slide guard which, when in the normal position, prevents the reel hubs from being inserted in the cassette. The guard panel of the cassette is interengaged with a reel locking mechanism which is automatically engaged when the guard panel is closed.

5 Claims, 5 Drawing Figures

MAGNETIC TAPE CASSETTE INCORPORATING PREVENTION OF UNWANTED ROTATION DURING TRANSPORTATION

BACKGROUND OF THE INVENTION

The present invention relates to magnetic tape cassettes, and more particularly to a compact cassette of the same or smaller size as the "Phillips" type compact cassette.

Recently, cassette tape recorders have been reduced both in size and in weight, and accordingly magnetic tape cassettes have also been miniaturized. Therefore, there has been a strong demand for the provision of small magnetic tape cassettes which are suitable for high-quality high-density long play recording and reproducing operations. Magnetic tape cassettes satisfying this requirement are operated according to a digital system such as a PCM (pulse code modulation) system in which recording and reproducing operations are carried out with input signals converted into pulse signals. In this system, the recording frequency band must be about five times as wide as that of a conventional audio tape. Therefore, video tape cassettes of larger size than compact audio cassettes are extensively employed with this recording system.

Video tape cassettes are typically operated in a rotary head system. The video tape cassettes have a guard panel which is upwardly swingable and which closes the opening which is formed in the front part thereof. The guard panel prevents the entrance of dust and protects the magnetic tape from damage.

The invention relates to a very small magnetic tape cassette which, similarly to video tape cassettes, employs a relatively wide frequency band recording and reproducing system. The cassette is usable with audio devices, and is equal to or smaller than the conventional compact audio cassette in size. Accordingly, the magnetic tape cassette is intricate in construction when compared with a conventional compact audio cassette, and therefore it is rather difficult to assemble. Furthermore, it is expected that the magnetic tape cassette may be frequently used outdoors. Accordingly, it is necessary for the magnetic tape cassette to have a structure which provides a dust-proofing effect. In addition, it is essential for the magnetic tape cassette to be designed so as to positively prevent jamming which occurs when the cassette is vibrated and the tape slackened while being carried.

SUMMARY OF THE INVENTION

In view of the foregoing, an object of the invention is to provide a digital audio magnetic tape cassette which is designed to positively prevent unwanted rotation of the hubs and which has excellent dust-proofing effects.

The foregoing object and other objects have been achieved by the provision of a magnetic tape cassette which incorporates a pair of hubs on which a magnetic tape is wound, and which comprises an opening through which the magnetic tape can be pulled out of the cassette, a swingable guard panel adapted to close the front part of the opening, a locking member having arms engaged with the right and left end pieces of the guard panel, and a pair of elongated engaging parts adapted to lock the hubs; in which, according to the invention, each of the pair of elongated engaging parts includes flexible bridge means for holding an end adapted to engage the respective hubs so that the engaging end is elastically retractable towards the front end of the cassette.

DESCRIPTION OF THE PREFERRED EMBODIMENTS

Figure 1:
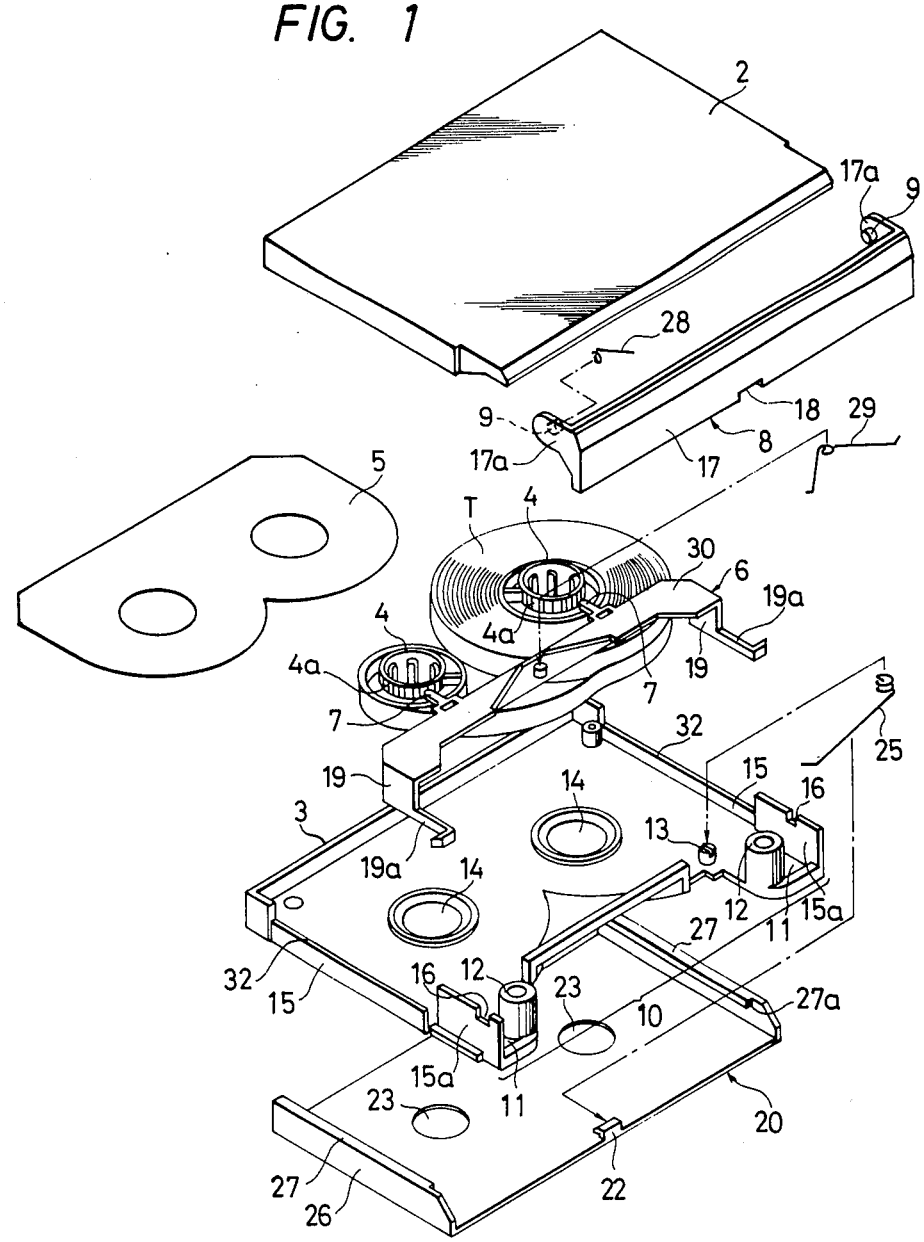
FIG. 1 is an exploded perspective view showing a magnetic tape cassette according to the invention.

FIG. 1 shows a magnetic tape cassette 1 whose size is equal to or smaller than that of a conventional compact cassette. the cassette 1 comprises a cassette case made up of upper and lower half cases 2 and 3. The cassette case incorporates a pair of hubs 4 on which a magnetic tape T is wound, friction sheets 5 for allowing the hubs 4 to rotate smoothly, and a locking member 6 for preventing unwanted rotation of the hubs 4. The cassette 1 further comprises a guard panel adapted to close the front part of an opening 10 formed in the front part of the cassette case; and a slide guard 20 adapted to close the lower part of the opening 10.

The hubs 4 have annular parts 4a protruding coaxially with the tape winding reels, engageable with the elongated engaging parts 7 of the locking member 6, respectively.

The guard panel 8 is substantially U-shaped in horizontal section, similarly to that of a conventional video tape cassette, and its right and left end pieces 17a have rotary supporting shafts 9, respectively, which protrude towards each other. The guard panel 8 is mounted on the cassette body in such a manner that the rotary supporting shafts 9 are rotatably engaged with holes 16 which are formed in the side walls 15 of the lower half case 3 when the upper and lower half cases 2 and 3 are joined together. The guard panel 8 is urged by a spring 28 to close the opening 10.

The guard panel 8 has a cut 18 at the middle of the lower edge of the front wall 17 thereof. The cut 18 is used to correctly load the magnetic tape cassette 1 in the magnetic tape recording and reproducing device. That is, only when an erroneous-insertion preventing protrusion provided in the cassette loading section of the recording and reproducing device enters the cut 18 can the magnetic tape cassette be correctly loaded in the recording and reproducing device.

The locking member 6 comprises: upper surface 30 which is set close to the inner surface of the upper half case 2; right and left arms 19 which extend along the side walls 15 of the cassette case from both ends of the upper surface 30; and extended pieces 19a which extend towards the front end of the cassette from the lower parts of the arms 19. The upper surface 30 is integral with the aforementioned elongated engaging parts 7 which are adapted to engage the hubs 4. The extended pieces 19a are bent at the ends toward the sides of the cassette.

Figure 2:
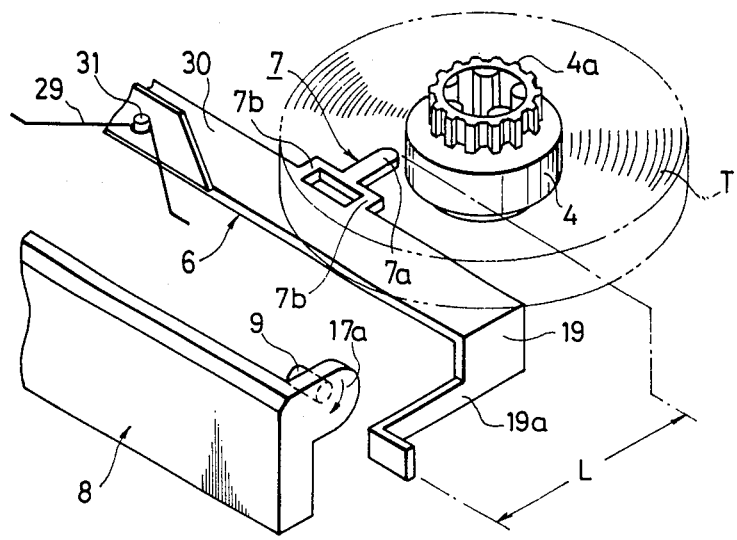
FIG. 2 is a perspective view illustrating the operation of a locking member in the magnetic tape cassette of FIG. 1.

Each elongated engaging part 7, as shown in FIG. 2, comprises: an engaging end 7a engaged with the annular part 4a of the hub 4; and right and left bridges 7b through which the engaging end 7a is made integral with the locking member body. The engaging part 7 can be bent in such a manner that the engaging end 7a is retracted towards the front end of the cassette. That is, the engaging part 7 can be deformed by external force in such a manner that the distance (L) between the end of the engaging end 7a and the end of the extended piece 19a is decreased. A recess is formed in the middle of the upper surface 30 of the locking member 6 in such a manner that it opens towards the front end of the cassette. A locking pin 31 in which a locking member spring 29 (described later) is fitted is formed in the recess.

The middle part of the locking member spring 29 is fitted on the spring locking pin 31, with both ends abutted against the inner surface of the front wall of the upper half case 2, so that the locking member 6 is urged towards the rear of the cassette at all times.

Similarly to the conventional video tape cassette, the lower half case 3 has a pair of reel shaft insertion holes 14 in correspondence to the hubs 4, and has tape withdrawing openings 11 at both ends of the opening 10 so that the magnetic tape T can be pulled out of the cassette. The bottom of the lower half case is formed so that the part thereof between the openings 11 is set back toward the rear end of the cassette. In other words, when the magnetic tape cassette 1 is loaded in the magnetic tape recording and reproducing device, the tape withdrawing member of the latter can be inserted into the cassette from below.

Steps 32 are formed on the upper edges of the side walls 15 of the lower half case 3 so that, when the cassette is assembled, slits are formed which extend along the side walls. The front portion of each of the right and left side walls 15 is formed as a partition 15a which is parallel with the remaining portion and is shifted from the latter inwardly of the cassette. The aforementioned holes 16 are formed in the partitions 15a.

The slide guard 20 is substantially in the form of a plate. The slide guard 20 is bent at right angles to have side pieces 26 at both ends which extend along the side walls 15 of the lower half case. The upper edges of the side pieces 26 extend slightly inwardly of the slide guard 20, thus forming overhangs 27. Furthermore, through-holes 23 are formed in the slide guard 20, which is placed on the bottom of the lower half case 3, in such a manner that the through-holes can be aligned with the reel shaft insertion holes 14. In addition, an engaging protrusion 22 is formed on the inner surface of the slide guard. A slide guard spring 25 adapted to urge the slide guard towards the front end of the cassette is engaged with the engaging protrusion 22. The protrusion 22 is received by the aforementioned cut 18 of the guard panel.

The front part of the upper half case 2 is designed so that, similarly to a conventional video tape cassette, tape withdrawing openings 11 are formed when it is combined with the lower half case 3. Means (not shown) for regulating the rotation positions of the hubs 4 is provided on the inner surface of the upper half case 2.

The magnetic tape cassette 1 is assembled as follows: First, the slide guard 20 is mounted on the lower surface of the lower half case 3. More specifically, the slide guard 20 is mounted on the lower half case 3 in such a manner that the upper edges of the steps 32 of the side walls 15 are engaged with the lower surfaces of the overhangs 27 of the slide guard 20.

One end of the slide guard spring 25 is fitted on a locking pin 13 which is formed on the lower half case 3, while the other end is engaged with the engaging protrusion 22. Therefore, the slide guard 20 is urged towards the front end of the cassette so that it is slidable forwardly and backwardly of the cassette.

Thereafter, the hubs 4 on which the magnetic tape T has been wound are placed on the friction sheet 5 placed on the inner surface of the lower half case 3 in such a manner that the hubs are in alignment with the reel shaft insertion holes 14, respectively. Then, the magnetic tape T is partially pulled out of the cassette through the openings 11 and laid over the right and left tape guides 12. Under this condition, another friction sheet 5 is placed over the hubs 4, and then the locking member 6 is placed on the friction sheet 5. The locking member 6 is urged in the predetermined direction by the locking member spring 29.

When the upper half case 2 is combined with the lower half case, the rotary supporting shafts 9 of the guard panel 8 are rotatably engaged with the holes 16, respectively, and the guard panel 8 itself is urged by the guard panel spring 28 to close the opening 10.

After the upper half case 2 is placed on the lower half case 3 as described above, these cases 2 and 3 are joined tightly with screws or the like to complete the assembly of the magnetic tape cassette.

When the magnetic tape cassette 1 thus assembled is in storage, the guard panel 8 and the slide guard 20 close the opening 10, and the elongated engaging parts 7 of the locking member 6 are abutted against the annular parts 4a of the hubs 4 to prevent rotation of the hubs.

The upper and lower half cases 2 and 3, the guard panel 8, and the locking member 6 are made of plastic resin such as polyacetal resin, ABS resin or PS resin, as in the case of the conventional magnetic tape cassette, and the slide guard 20 may also be made of metal such as stainless steel. However, it is preferable that the slide guard 20 be made of the same material as the upper and lower half cases 2 and 3, because if the slide guard is made of metal, then repeated sliding of the slide guard may scrape the plastic cassette body.

The locking member 6 may be made of any material which allows the elongated engaging parts 7 to deflect towards the front end of the cassette. For instance, the locking member 6 may be molded of the same plastic material as the guard panel. In this case, the locking member 6 can be readily manufactured at low cost.

The magnetic tape T may be a ferromagnetic iron oxide or chromium dioxide tape; however, it is desirable to use a magnetic tape such as a metal tape or vacuum deposition tape which is suitable for high density recording and reproducing operations.

Figure 3:
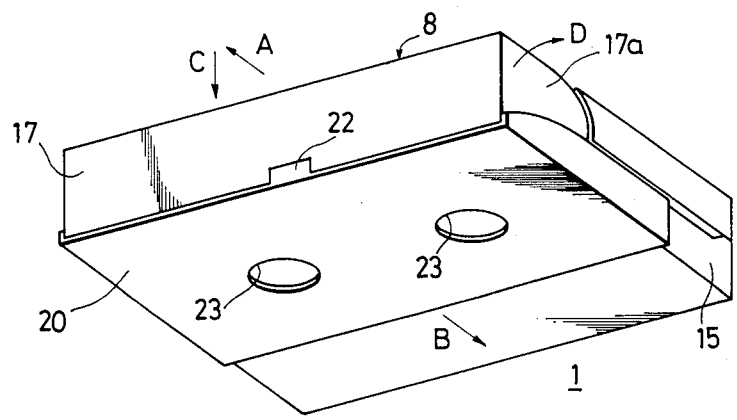
FIG. 3 is a perspective view showing the assembled magnetic tape cassette.

In loading the magnetic tape cassette in the magnetic tape recording and reproducing device, the various parts operate as follows:

In order to load the magnetic tape cassette 1 in the magnetic tape recording and reproducing device, the opening 10 is held forwards (in the direction of the arrow A in FIG. 3). In the cassette insertion operation, the engaging protrusion 22 of the slide guard 20 is, for instance, abutted against the erroneous-insertion preventing protrusion in the cassette insertion section so that the slide guard slides towards the rear end of the cassette (in the direction of the arrow B). As a result, the lower part of the opening 10 is opened, while the through-holes 23 are aligned with the reel shaft insertion holes 14, respectively, so as to be readied for receiving the hub driving reel shafts.

Thereafter, the magnetic tape cassette 1 is moved in a direction perpendicular to the direction of insertion, i.e., downwardly (in the direction of the arrow C). In this operation, the lower edge of the guard panel 8 is abutted against guard panel opening means provided at an inner part of the cassette insertion section, so that the guard panel is swung upwardly (in the direction of the arrow D), with the rotary supporting shafts 9 as a rotating axis. As the guard panel 8 is opened, the lower edges of the right and left end pieces 17a engage with the extended pieces 19a of the locking member 6, to slide the latter 6 towards the front end of the cassette.

As a result, the engaging ends 7a of the engaging parts 7 are disengaged from the annular parts 4a of the hubs 4, thus freeing the latter.

When the loading of the magnetic tape cassette has been accomplished by inserting it and by moving it downwardly, and the opening 10 has been completely opened by sliding the slide guard 20 and by swinging the guard panel 8 as described above, the annular parts 4a of the hubs 4 are disengaged from the engaging parts 7. As a result, the magnetic tape T can be partially pulled out of the cassette, and the hubs 4 can be turned. Thus, a recording or reproducing operation can be performed according to a rotary head system.

In unloading the magnetic tape cassette 1 from the magnetic tape recording and reproducing device, the cassette 1 is moved oppositely in comparison with the loading operation. First, the guard panel 8 is disengaged from the guard panel opening means, thus closing the front part of the opening 10 with the aid of the guard panel spring 27. In succession, the magnetic tape cassette 1 is pulled out, as a result of which the slide guard 20 is disengaged from the erroneous insertion preventing protrusion and slides towards the front end of the cassette by means of the slide guard spring 20, so that the opening 10 is completely closed.

As the guard panel 8 swings to close the opening 10, the right and left end pieces 17a of the guard panel 8 are disengaged from the extended pieces 19a of the locking member 6. As a result, the locking member 6 slides towards the rear end of the cassette by means of the elastic force of the spring 29, so that the engaging ends 7a of the engaging parts 7 abut against the annular parts 4a of the hubs 4, thus locking the latter. As the slide guard 20 slides so as to close the opening 10, the reel shaft insertion holes 14, being displaced from the through-holes 23, are closed.

Figure 4:
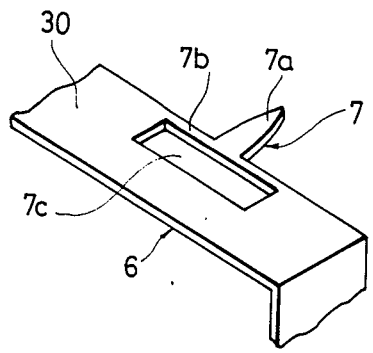
FIGS. 4 and 5 are perspective views showing modifications of the magnetic tape cassette according to the invention.
Figure 5:
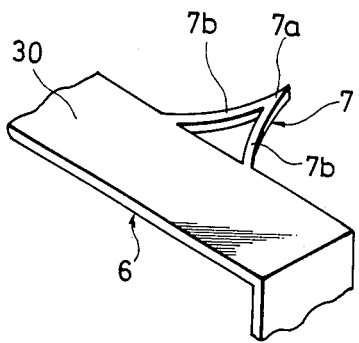

While one embodiment of the invention has been described, the same is not limited thereto or thereby. That is, the elongated engaging part 7 may be modified as shown in FIGS. 4 and 5.

In a first modification of the engaging part 7, no bridges (7b) extend from the upper surface 30; i.e., the engaging end 7a is extended from the middle of the bridge 7b. In other words, in the engaging part 7 in FIG. 4, a rectangular hole 7c is formed near the base of the engaging end 7a.

In a second modification, the engaging part 7 is substantially triangular. In other words, two bridges 7b extend from the upper surface 30 and join together as indicated at 7a, thus forming a triangle. The summit of the triangle serves as the engaging end 7a which is adapted to be engaged with the annular part 4a of the hub 4.

It has been stated that the present technical concept may be applied to a digital audio magnetic tape cassette which is equal to or smaller than a conventional audio compact cassette. However, the invention is also applicable to conventional video tape cassettes and other magnetic tape cassettes.

As is apparent from the above description, when the magnetic tape cassette is in storage, the opening 10 is maintained completely closed by the guard panel 8 and the slide guard 20, and the reel shaft insertion holes 14 are closed by the slide guard 20. Therefore, the magnetic tape T is protected from damage and dust; i.e., the recording and reproducing characteristics of the magnetic tape can be maintained unchanged.

The locking member 6 is designed so that it is urged by the locking member spring 29 to cause the elongated engaging parts 7 to lock the hubs 4, and the engaging parts 7 themselves are made elastic in the same direction as the spring 29. That is, two elastic forces are utilized to positively lock the hubs 4.

As the magnetic tape cassette 1 is decreased in size, the locking member 6 must be increased in operation timing accuracy, and the dimension (L) of the locking member must be improved in accuracy. However, since the bridges 7b are deformed to maintain the dimension (L) at a suitable value when the locking member 6 locks the hubs 4, the dimension (L) can be determined with a relatively large allowance. Accordingly, the locking member 6 can be readily manufactured.

What is claimed is:

1. In a magnetic tape cassette of the type incorporating a pair of hubs on which a magnetic tape is wound, an opening through which said magnetic tape can be pulled out of said cassette, and a swingable guard panel having right and left-hand end pieces, said guard panel being adapted to close the front part of said opening; the improvement comprising a locking member having arms engaged with said right and left-hand end pieces of said guard panel, wherein each of said pair of elongated engaging parts comprises flexible bridge means for flexibly holding an engaging end of the respective engaging part in positive engagement with the respective hub so that said engaging end is elastically retractable towards the front end of said cassette, a pair of elongated engaging parts adapted to lock said hubs, and spring means for urging said engaging parts into contact with said hubs when said guard panel is closed, said end pieces of said guard panel camming said engaging parts out of engagement with said hubs as said guard panel is opened.

2. A cassette as claimed in claim 1, further including slide guard means connected to a bottom of said cassette, and including apertures normally non-aligned with said hubs, and spring means urging said slide guard toward said non-aligned position to prevent the cassette hubs from being engaged with driving spindles of a cassette player/recorder.

3. A cassette as claimed in claim 2, wherein said slide guard means includes means for closing a part of said opening, and said guard panel comprises means for closing the remainder of said opening.

4. A cassette as claimed in claim 1, wherein each of said elongated engaging parts include an extended portion, and bridge means joining said extended portion to said locking member.

5. A cassette as claimed in claim 1, wherein each of said elongated parts comprises a pair of elastic members joined at one end so as to form a triangular shape with a body of said locking member.

* * * * *